UNITED STATES PATENT OFFICE.

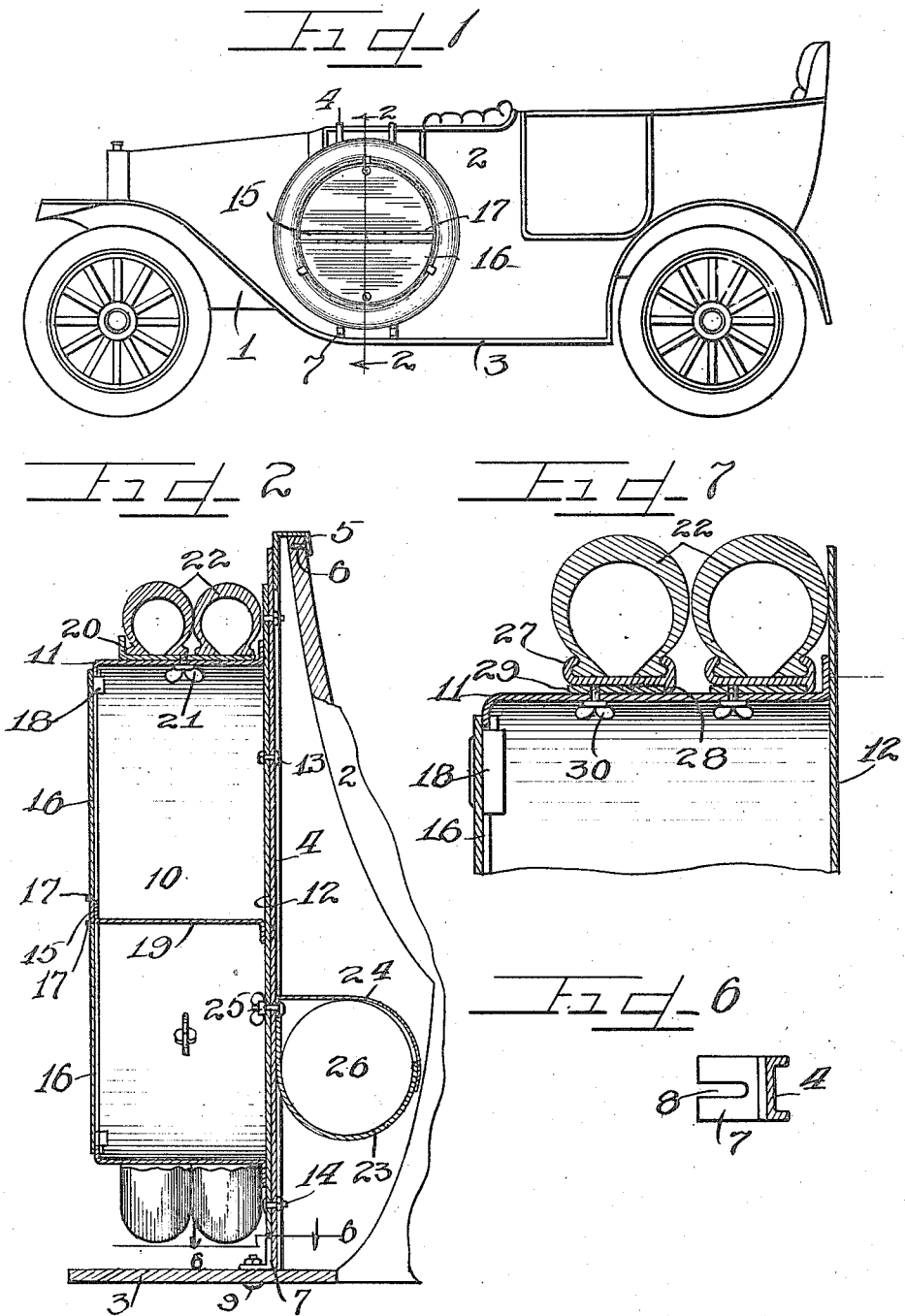

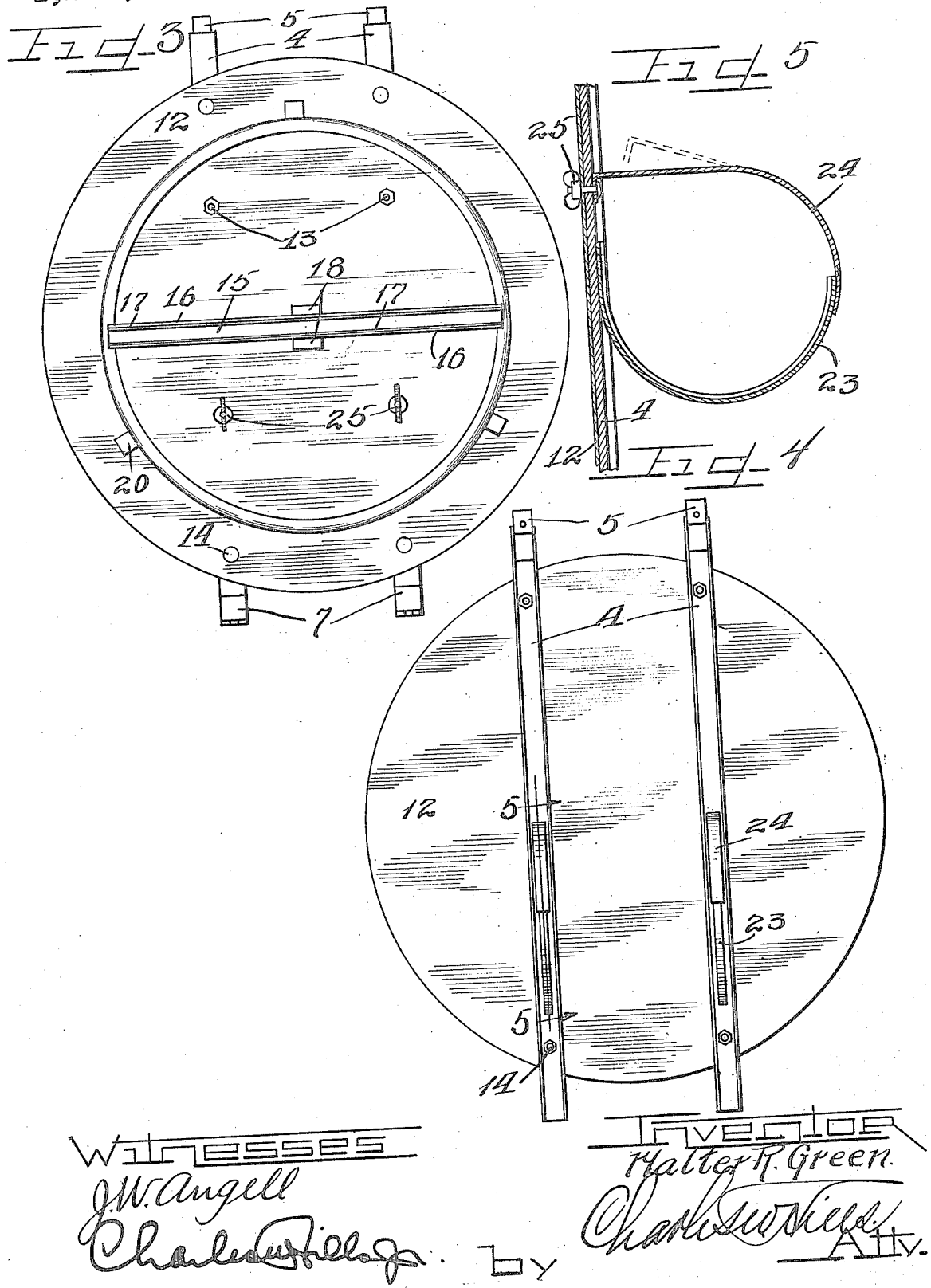

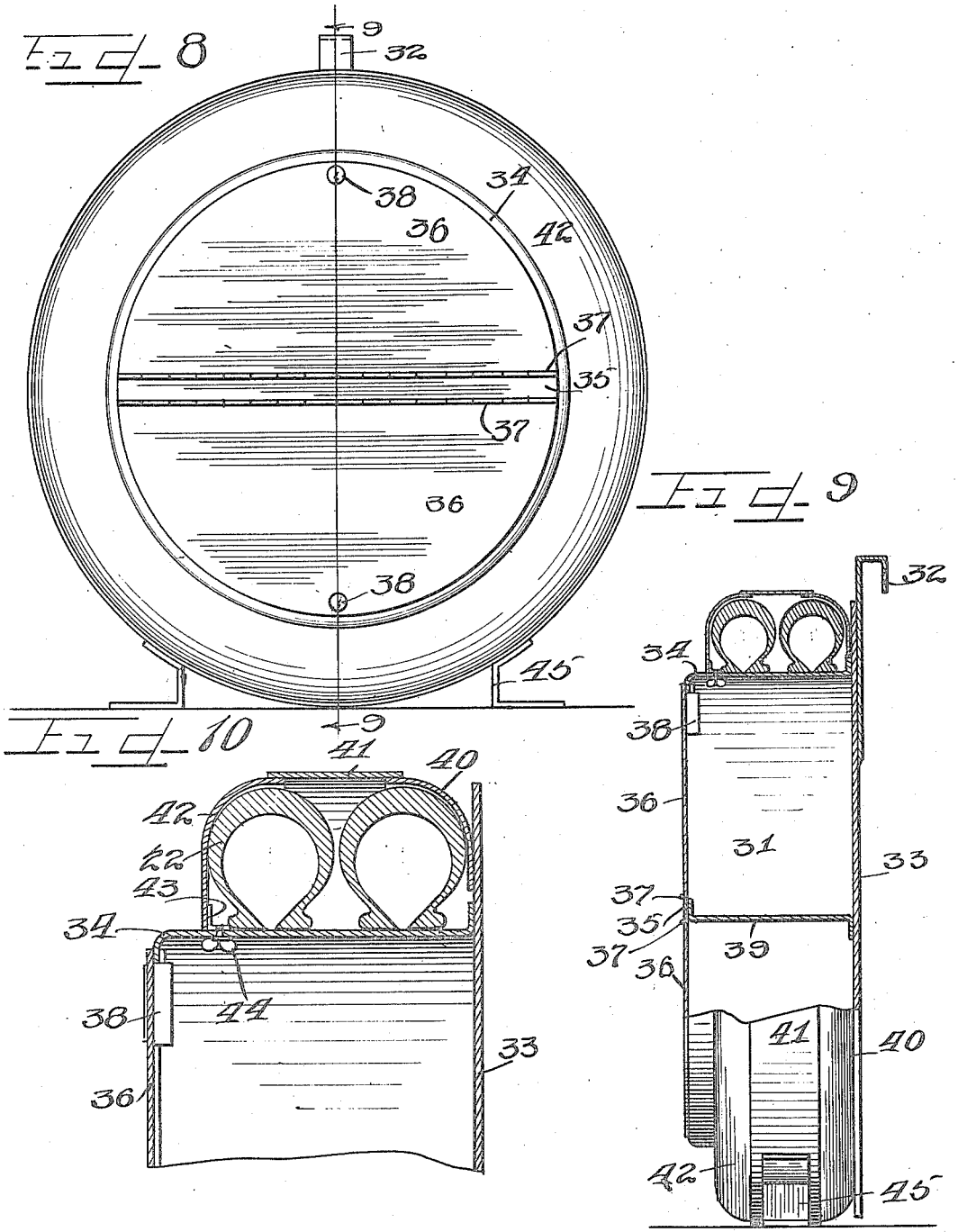

WALTER R. GREEN, OF CHICAGO, ILLINOIS.

TIRE AND LUGGAGE CARRIER.

1,234,155.            Specification of Letters Patent.      Patented July 24, 1917.

Application filed April 22, 1915. Serial No. 23,173.

*To all whom it may concern:*

Be it known that I, WALTER R. GREEN, a citizen of the United States, and a resident of the city of Chicago, in the county of Cook and State of Illinois, have invented certain new and useful Improvements in Tire and Luggage Carriers; and I do hereby declare that the following is a full, clear, and exact description of the same, reference being had to the accompanying drawings, and the numerals of reference marked thereon, which form a part of this specification.

There are many different types of tire holders and luggage carriers on the market, but as a general rule those constructed of metal have been cumbersome and unduly heavy. Furthermore, tire and luggage holders have been constructed separately requiring an excessive amount of space for mounting, and comprising complicated parts, thus necessitating an unwarrantable amount of time and delay to insert or remove the tires, or to gain access to the luggage carriers. The devices of this type have furthermore proven unsatisfactory on account of the exposed means provided for holding the tires and carriers in position on automobiles, affording opportunities resulting in the stealing of tires and luggage.

This invention relates to a combination lightweight metal tire and luggage carrier consisting of few parts and adapted to retain a tire upon the luggage carrier, either in an exposed or in an entirely incased condition, when said tire is either free of a rim, or is mounted upon a rim.

It is an object of this invention to construct a combination tire and luggage carrier adapted for carrying a plurality of tires on the exterior thereof, and luggage in the interior thereof.

It is also an object of this invention to construct a tire and luggage carrier, which may exteriorly accommodate either a tire mounted on a rim, or a tire entirely detached from either a rim or wheel, affording compartments for luggage in the interior, and having a presto-light tank support on the rear thereof.

It is also an object of this invention to construct a combination tire and luggage carrier adapted for supporting tires, luggage and a presto-light tank, removable only when the doors of the luggage compartment are unlocked.

It is furthermore an object of this invention to construct a drum having a shelf on the interior thereof, and provided with doors equipped with locks, the drum serving to securely mount tires and a gas tank on the exterior thereof, removable by means of fasteners adjustable only from the interior of the drum, when the doors thereof are in open position.

It is finally an object of this invention to construct a tire and luggage holder light in weight, durable in construction, simple in operation and effectually providing mountings for a tire and a tank, and compartments for carrying luggage.

The invention (in a preferred form) is illustrated in the drawings and hereinafter more fully described.

In the drawings:

Figure 1, is a conventional side elevation of an automobile provided with a tire and luggage holder embodying the principles of my invention.

Fig. 2, is a sectional view taken through the device on line 2—2, of Fig. 1, showing parts in elevation, and a portion of the automobile body.

Fig. 3, is a front elevation of the device with the doors opened to horizontal position.

Fig. 4, is a rear elevation thereof.

Fig. 5, is a fragmentary detail section on line 5—5, of Fig. 4, with parts omitted.

Fig. 6, is a fragmentary detail section on line 6—6, of Fig. 2, with parts omitted.

Fig. 7, is a fragmentary detailed sectional view through the upper portion of a modified form of my device showing tire holders for tires mounted on rims.

Fig. 8, is a front elevation of another modified form of my device, with the doors closed.

Fig. 9, is a sectional view taken on line 9—9 of Fig. 8, showing parts in elevation.

Fig. 10, is a fragmentary detail sectional view of the modified form of tire holder, shown in Fig. 8.

As shown in the drawings:

Reference numeral 1, indicates as a whole an automobile, having a body 2, and a running board 3, connected thereto in the usual manner. Channel bars 4, provided with hooks 5, spot welded, or secured in any other suitable manner to the upper ends thereof, are connected to the forward side of body 2, and held in place by screws 6. Also suitably connected, preferably by spot welding to the lower ends of said bars 4, are angle braces 7, having slots 8, therein for detachably holding said bars 4, in place upon the running board 3, by means of bolts 9.

A drum 10, provided with an annular rim 11, and a back plate 12, is detachably secured to said channel bars 4, from the interior of the drum 10, by thumb-bolts 13, and from the exterior of the drum by bolts 14. Laterally disposed across the front of the drum 10, and spot welded to the rim 11, is a metallic strip 15, to which doors 16, are attached by means of hinges 17. Said doors 16, are provided with locks 18. Secured to the interior of the drum 10, is a shelf 19, which is preferably spot welded though not necessarily so, connected at its rear to the back plate 12, and at its front to strip 15, said shelf 19, dividing the interior of the drum 10, into an upper and a lower compartment adapted for carrying luggage.

Spaced at intervals around the rim 11, are angled retaining lugs 20, mounted with the shorter wall thereof near the front of the drum 10, and held in place on said rim 11, by means of thumb-screw 21, insertible through rim 11, from the interior of the drum 10. Said lugs 20, and thumb-screws 21, are provided for securely holding spare tires 22, in place upon the exterior of the drum 10. Spot welded to the channel bars 4, are curved resilient metallic bands 23, projecting toward the body 2, each of said bands 23, having welded thereto, one end of wider resilient curved bands 24, and with their other ends bent at right angles to afford a means for detachably securing the same to the bars 4, by means of thumb-bolts 25, inserted so that the nut thereof is only adjustable from the interior of the drum 10. The welded bands 23 and 24, thus form resilient ring supports for holding a presto-light tank 26, in position between the back of the tire and luggage carrier and the body 2, of the automobile 1. The bands 24, have sufficient resiliency when released by thumb-bolts 25, to spring into open position as shown by dotted lines in Fig. 5, for inserting or removing the tank 26.

In cases where the tires 22, are mounted upon demountable rims, a slight variation in the construction is made, as shown in Fig. 7. The demountable rims are indicated by the reference numeral 27, and abutting the projections 28, of said rims are retaining plates 29, inserted between the carrier rim 11, and the demountable rims 27. Said plates 29, are spaced at intervals around the periphery of rim 11, and held in position by thumb-screws 30, inserted from the interior of the drum 10, through the rim 11, and threaded into the plates 29.

In the modification of my invention illustrated in Figs. 8, 9 and 10, the device consists of a drum 31, adapted to be suspended over the side of an automobile body, similar to the illustration covered in Fig. 1, by means of a hook member 32, welded on the upper end of back plate 33, of the drum 31. Said drum embraces an annular rim 34, with a strip 35, secured across the front of said rim, and doors 36, connected with said strip 35, by means of hinges 37. Locks 38, are provided on each of said doors, and a shelf 39, is rigidly welded to the strip 35, and back plate 33, the construction of these members being similar to those hereinbefore described. Spot welded to the back plate 33, near the edge thereof, or, of course, secured thereto in any suitable manner, is a ring 40, having a band 41, welded thereon. Another ring 42, has one side thereof slidable under the band 41, while the other side has a curved angle iron 43, welded thereon. Said rings 40 and 42, together with the band 41, form a resilient hood for incasing and holding the tires 22, in place upon the drum 31. The hood is firmly held in closed position by means of thumb-screws 44, inserted from the interior of the drum 31, passing through the rim 34, and threaded into the angle iron 43. Spot welded to the bottom of the band 41, on each side thereof, are supports 45, adapted to rest upon the running board of an automobile, and to be secured thereto by any suitable means.

The operation is as follows:

When tires are to be carried on the tire holder the doors 16, of the drum 10, are opened and lugs 20, are removed by unscrewing the thumb-screws 21, from the interior of the drum 10. The tires 22, are then slipped over the rim 11, and the lugs 20, replaced and secured to the rim 11, by the thumb-screws 21. When a presto-light tank is to be carried the thumb-bolts 25, are unloosened from the interior of the drum 10, and due to the resiliency of the bands 23, and 24, the same spring back to allow the tank 26, to be inserted in the ring supports formed by bands 23 and 24, which are then drawn back into position and securely held in place by the thumb-bolts 25, attached from the interior of the drum 10. The interior of the drum 10, may of course, be used for carrying whatever luggage is needed.

In the modification illustrated in Fig. 7, the plates 29, are removed by unscrewing the thumb-screws 30. The tires 22, mounted on the demountable rims 27, are then placed over the rim 11, with the rim projections 28, toward the back plate 12. The plates 29, are then replaced so that they abut the projections 28, in which position the plates 29, are securely held by the thumb-screws 30.

In the modification illustrated in Figs. 8, 9 and 10, the tires 22, are incased by the hood formed by the members 40, 41 and 42. The ring 42, being removed to permit the insertion of the tires 22.

It is, of course, obvious that the device may be located on the rear or along other parts of an automobile, and may also be used on other types of vehicles.

I am aware that various details of construction may be varied through a wide range without departing from the principles of this invention, and I therefore do not purpose limiting the patent granted otherwise than necessitated by the prior art.

I claim as my invention:

1. In a tire and luggage carrier of the class described, a luggage drum, means projecting through the walls of said drum for holding spare tires in place thereon, said means adapted to be adjusted from the interior of said drum only.

2. In a tire and luggage carrier of the class described, a drum, means for supporting a gas tank on the rear thereof, means for holding spare tires in position on the rim of said drum, and interiorly adjustable means projecting through the walls of said drum to engage said means to hold the same in position.

3. In a device of the class described, a luggage drum, means for attaching the same to an automobile, doors on the front of said drum, a plurality of members for holding spare tires in place upon said drum, supports on the rear of said drum adapted to support a tank, and means adjustable from the interior of said drum for holding said members and supports in place.

4. In a device of the class described, a luggage drum, means for mounting the same upon an automobile, resilient supports for a gas tank on the rear of said drum, lugs detachably mounted on the rim of said drum for holding spare tires in place thereon, a shelf in said drum for supporting luggage, doors hingedly secured to said drum, and locks on said doors to prevent removal of the tires or tank, when said doors are locked.

5. In a device of the class described, a plurality of supports, hooks rigidly secured to the tops thereof, slotted angle braces secured to the bottom of said supports, a luggage drum detachably mounted on said supports, a shelf therein, hingedly connected doors on said drum, locks therefor, angled lugs mounted on said drum adapted for retaining spare tires in place thereon, thumbscrews for holding said lugs in position, resilient straps having one end of each thereof permanently secured on the back of said supports, the other end of said straps adapted to be detachably secured to said supports and drums, thumb-bolts for holding said straps in position, said thumb-bolts adjustable from the interior of said drum only, said resilient straps adapted for holding a presto-light tank disposed between said supports and the body of an automobile.

6. In a device of the class described, supports adapted to be mounted on an automobile, a luggage drum detachably mounted on one side of said supports, resilient braces for carrying a gas tank mounted on said supports opposite said drum, and means mounted on the rim of said drum and projecting therethrough for tightly holding spare tires in place thereon.

7. In a device of the class described, a luggage drum, members mounted on said drum adapted for holding tires in place upon the rim of said drum, and means projecting through said drum and adjustable from the interior of said drum for holding said members in position.

8. In a device of the class described, a luggage drum, supports therefor adapted to be attached to an automobile, members mounted on the rim of said drum adapted for holding demountable rim tires in place upon said drum, and means adjustable from the interior of said drum for holding said members in position on said rim.

In testimony whereof I have hereunto subscribed my name in the presence of two subscribing witnesses.

WALTER R. GREEN.

Witnesses:
CHARLES W. HILLS, Jr.,
LAWRENCE REELISTEIN.